June 23, 1925.
J. C. GINDRAUX
NONSKID FABRIC SHOE
Filed Oct. 17, 1923
1,543,003
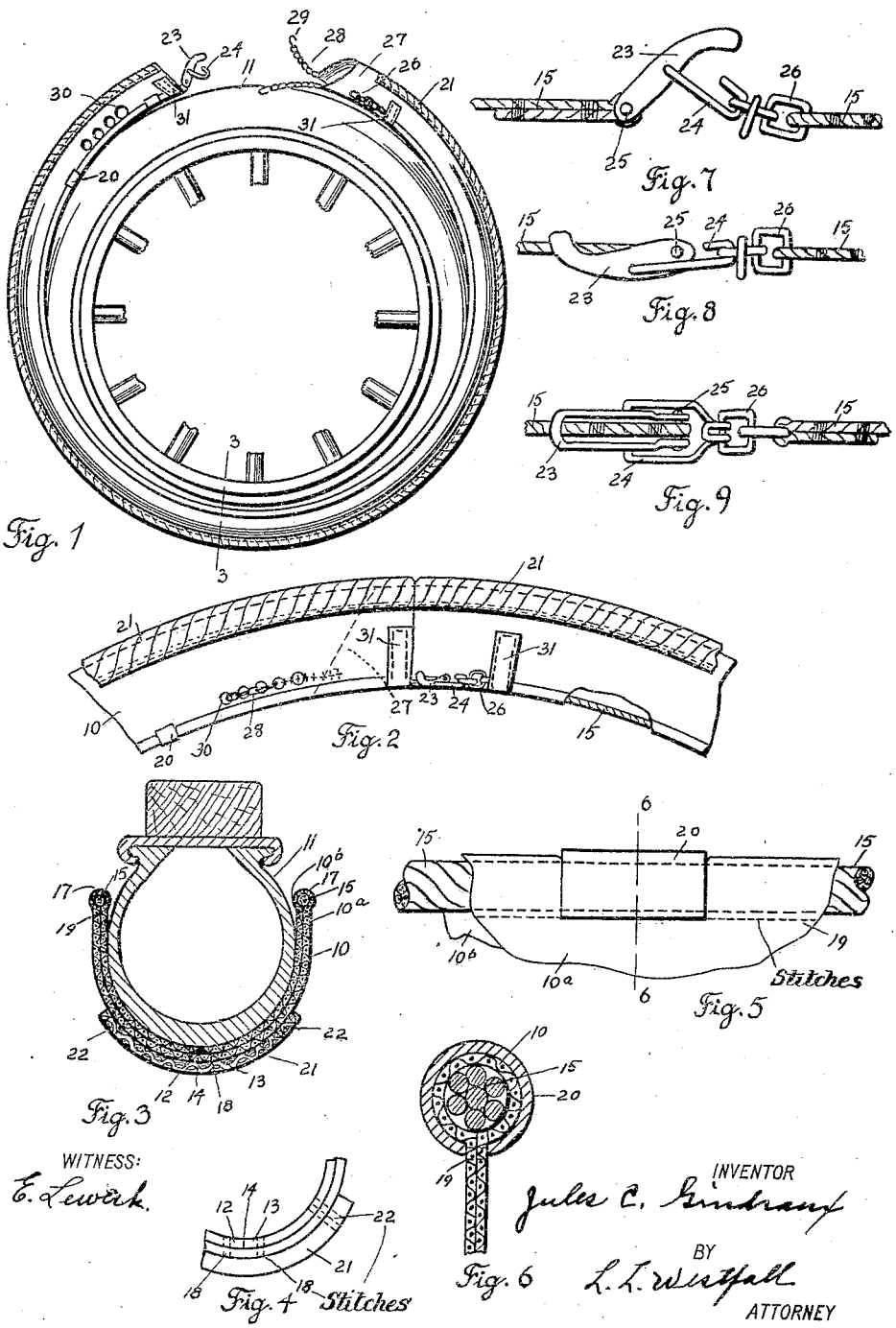
WITNESS:
E. Lewak
INVENTOR
Jules C. Gindraux
BY
L. L. Westfall
ATTORNEY Patented June 23, 1925.

1,543,003

UNITED STATES PATENT OFFICE.

JULES C. GINDRAUX, OF SPOKANE, WASHINGTON.

NONSKID FABRIC SHOE.

Application filed October 17, 1923. Serial No. 669,051.

*To all whom it may concern:*

Be it known that I, JULES C. GINDRAUX, a citizen of the United States of America, residing at Spokane, Spokane County, State of Washington, have invented new and useful Improvements in Nonskid Fabric Shoes, of which the following is a specification.

This invention pertains to non-skid shoe equipment for pneumatic automobile tires, and has for its object to provide an improved construction to be removably attached to the outer surface of the tire casing. In view of the fact that automobile travel is becoming more and more confined to pavement, the construction is made particularly applicable for pavement travel use and the tread is so constructed and made of materials that will increase the traction power of the wheels of the vehicle and prevent skidding on the pavement if moist or wet by reason of snow, ice or rain.

Another object of the invention is to so construct the shoes that they may be readily folded or rolled and formed into small and suitable packages for carrying in the vehicle, when the same are not in use. The invention will be hereinafter particularly described, illustrated in the accompanying drawings and pointed out in the claims. In the drawings, Figure 1 shows a broken-away portion of an automobile wheel, with an inflated tire in position thereon and the improved non-skid shoe construction in process of being adjusted to the outer surface of the tire.

Figure 2 is a side elevation of a broken-away portion of the improved shoe, the same being illustrative of the manner of securing the ends of the shoe together when in place on the tire.

Figure 3 is a sectional view taken on the line 3—3 of Figure 1.

Figure 4 is a diagrammatic view, illustrative of the manner in which a tread is secured to the shoe.

Figure 5 is a broken-away view of the shoe, showing a manner of using cables to hold the shoe in position on the tire and a means for holding the shoe and cables in relative position as pertains to slippage of the cables.

Figure 6 is a sectional view taken on the line 6—6 of Figure 5.

Figure 7 shows a broken-away view of the ends of the cable and a side elevation of a connecting means for such ends to hold the shoe firmly in place on the tire, the connecting means being shown in process of placement.

Figure 8 is a like view with the connecting means in place and

Figure 9 is a plan view of Figure 8.

In a detail description in which like numerals refer to like parts throughout the several views, a shoe 10 composed of a suitable fabric of canvas, ducking or the like, is manufactured to conform to the contour of the outer surface of a tire casing 11, such shoe comprising two layers of such fabric, both in one piece, the two layers being folded together with the outer edges of the fabric brought together at the longitudinal center of the shoe on the inner side; for instance, the layers $10^a$ and $10^b$ are folded together as shown in Figure 5 and the outer edges 12 and 13 brought together at 14. In the folding of the fabric together as stated, cables 15 are engaged in the folds so that they will occupy the edges 17 of the formed shoe. The ends 12 and 13 of the fabric 10 are stitched to the position shown in Figure 3 by stitches 18 passing through both the fabric layers 12 and 13. The cables 15 are held to their positions at the edges 17 by means of stitches 19 which pass through both layers 12 and 13. The cables 15 are held to position as against undue longitudinal slippage by means of metal clamps 20 placed in spaced relation to each other over the edges 17 and engaging the cables as shown in Figures 5 and 6.

A tread 21 composed preferably of heavy cotton webbing, is stitched to the shoe fabric 10 at 22 and after the same has deteriorated beyond use, the stitches may be removed, the tread removed and replaced in the same manner by a new one. In order to substantially secure the shoe 10 to the tire 11, a latch 23, having pivotally attached thereto, a hook 24, is secured to one end of the cable 15 by means of a pivot 25, the opposite end of the cable 15 has attached thereto, an open link chain 26. By engaging a selected link of the chain 26 with the hook 24 while the latch 23 is in the position shown in Figure 7 and then manually turning the latch 23 to the position shown in Figure 8, the cables are rigidly secured and the shoe 10 firmly held.

In order to make the uniting of the ends of the shoe 10 more secure in placing the shoe on the tire 11, there is provided a flap 27 secured to one end of the shoe 10 and which goes on the inside of the opposite end of the shoe, as indicated in Figure 2, the same being held to position by means of chains 28 attached thereto, such chains having hooks 29 at their free ends, which are passed through openings 30 in the opposite end of the shoe and the hooks then fastened over the edges of the openings 30 as shown in Figure 2.

Re-inforcing strips 31 are stitched to the ends of the shoe 10 in order to make a more durable construction.

What is claimed is:

1. A non-skid fabric shoe for automobile tires, comprising a canvas strip manufactured to fit the outer contour of an automobile tire, one end of such strip having a flap adapted for engaging the inner surface of the other end of the strip, means comprising cables connected with such flap and joined to the opposite end of the strip for fastening such flap on the inner side of said opposite end, a cable stitched to position along each of the longitudinal edges of said strip, means for securing the ends of the cables together and a fabric tread stitched to the outer surface of said strip.

2. A non-skid fabric shoe for automobile tires, comprising a canvas strip manufactured to fit the outer contour of an automobile tire, cables stitched to position along the longitudinal edges of the strip and means for securing the ends of the strip and the ends of the cable together when the shoe is in position over the tire, clamps for binding the cables and shoe as against undue slippage with relation to each other, and a fabric tread stitched to the outer surface of said strip.

3. A non-skid fabric shoe for automobile tires, comprising a canvas strip manufactured to fit the outer contour of an automobile tire, means for fastening the ends of the strip together when in position on the tire, a cable stitched to position along each of the longitudinal edges of said strip, means for securing the ends of the cable together when the shoe is in position on the tire, such means comprising a lever latch with a hook attached secured to one end of each cable and an open link chain attached to the other ends of the cables, the hooks being adapted for engagement with the links and the cables adjusted and tightened by means of the manual turning of the latch.

In testimony whereof, I affix my signature.

JULES C. GINDRAUX.